United States Patent [19]

Yang

[11] Patent Number: 4,832,975
[45] Date of Patent: May 23, 1989

[54] TAILORED TRIGLYCERIDES HAVING IMPROVED AUTOIGNITION CHARACTERISTICS

[75] Inventor: David K. Yang, Cincinnati, Ohio

[73] Assignee: The Procter & Gamble Company, Cincinnati, Ohio

[21] Appl. No.: 102,071

[22] Filed: Sep. 29, 1987

[51] Int. Cl.$^4$ ............................................. A23D 5/00
[52] U.S. Cl. .................... 426/607; 260/410.7; 426/549; 426/580; 426/601; 426/603; 426/804
[58] Field of Search ............... 514/546, 547, 557; 2160/410.7; 426/601, 607, 804, 549, 580, 603, 604

[56] References Cited

U.S. PATENT DOCUMENTS

| | | | |
|---|---|---|---|
| 2,874,056 | 2/1959 | Drew | 260/410.7 X |
| 3,450,819 | 6/1969 | Babayan et al. | 514/557 |
| 4,528,197 | 7/1985 | Blackburn | 514/552 |
| 4,607,052 | 8/1986 | Mendy et al. | 514/547 |

FOREIGN PATENT DOCUMENTS 216419  4/1987  European Pat. Off. .

OTHER PUBLICATIONS

Mok, et al., "Structured Medium-Chain and Long-Chain Triglyceride Emulsions are Superior to Physical Mixtures in Sparing Body Protein in the Burned Rat", *Metabolism*, vol. 33, (Oct. 1984), pp. 910-15.

Maiz et al., "Protein Metabolism During Total Parenteral Nutrition (TPN) in Injured Rats Using Medium-Chain Triglycerides", *Metabolism*, vol. 33, (Oct. 1984) pp. 901-909.

*Primary Examiner*—Donald E. Czaja
*Assistant Examiner*—Celine T. Callahan
*Attorney, Agent, or Firm*—B. S. Hersko; R. A. Dabek; R. C. Witte

[57] ABSTRACT

Reduced calorie edible fats and oils comprising triglycerides synthesized (tailored) with a particular combination of saturated medium chain fatty acids, saturated long chain fatty acids, and unsaturated long chain fatty acids are disclosed. In addition to providing caloric reduction, these tailored triglycerides also have acceptable autoignition characteristics making them suitable for use in shortenings and cooking oils.

18 Claims, No Drawings

TAILORED TRIGLYCERIDES HAVING IMPROVED AUTOIGNITION CHARACTERISTICS

TECHNICAL FIELD

The present invention relates to reduced calorie fats and oils, in particular triglycerides synthesized (tailored) with a combination of saturated medium chain fatty acids, saturated long chain fatty acids, and unsaturated long chain fatty acids. In addition to providing caloric reduction, these tailored triglycerides also have acceptable autoignition characteristics and are suitable for use in cooking shrotenings and oils.

BACKGROUND OF THE INVENTION

Typical vegetable oils and animal fats used in food products contain fatty acid moieties which are predominantly 16 or 18 carbon atoms long and contain zero to three double bonds. These natural oils and fats are generally referred to as long chain triglycerides.

Medium chain triglycerides ("MCT's") are triglycerides made with saturated $C_6$ to $C_{10}$ fatty acids. These synthetic shorter chain triglycerides are metabolized differently by the body because they are more water-soluble than long chain triglycerides. In brief, long chain triglycerides are hydrolyzed into long chain fatty acids and monoglycerides, absorbed, reesterified, incorporated into chylomicron structures, and transported into the lymph. Whereas, MCT's are rapidly hydrolyzed to medium chain fatty acids which are then absorbed into the portal vein and oxidized by the liver. As a result, the body tends to treat the energy from MCT's similarly to the energy from carbohydrates. MCT's contain at least about 10% fewer calories than most triglycerides found in vegetable oils and animal fats as determined by bomb calorimetry. Additionally, because the body is inefficient in converting MCT's to body fat, the metabolizable or net calories that MCT's provide are actually lower than the 10% reduction predicted by conventional measurements. As a result, it would be highly desirable to include MCT's as the fat component in food products.

Unfortunately, MCT's have some potentially serious limitations when used in food products, especially when MCT's are used in cooking. For example, frying with MCT's can be difficult because they have lower smoke, flash and fire point temperatures, as well as unacceptable autoignition characteristics compared with those of most commercial frying shortening or oils. In addition, reuse of MCT oils for frying can impart raw "coconut-type" off-flavors in some foods.

It has now been found that a fat composition consisting of triglycerides synthesized with a particular combination of saturated medium chain fatty acids, saturated long chain fatty acids, and unsaturated long chain fatty acids provides reduced calories, excellent organoleptic properties, and autoignition characteristics which are superior to those of conventional MCT's. Thus, this class of novel triglycerides provides the advantages of MCT's without the negatives discussed above.

It is therefore an object of the present invention to provide a specially synthesized (tailored) fat composition that is reduced in calories when compared to conventional fat compositions.

It is another object of the present invention to provide a reduced calorie fat composition which possesses acceptable autoignition characteristics and hence is suitable for use in cooking shortenings and oils.

It is a further object of this invention to provide a reduced calorie fat having excellent organoleptic properties that can be used in a wide variety of food and beverage products.

All parts, percentages, and ratios used herein are by weight unless otherwise indicated.

BACKGROUND ART

Triglycerides containing combinations of medium chain and long chain fatty acid moieties are known in the art. For example, U.S. Pat. No. 4,607,052, Mendy et al., issued Aug. 19, 1986, discloses triglycerides of the formula:

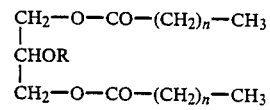

where R represents an acyl fragment of a polyunsaturated fatty acid containing 18 to 22 carbon atoms, the acyl fragment being capable of being oxidized, and where n represents an integer varying from 2 to 16. The triglycerides are used as nutritional supplements to provide a source of polyunsaturated fatty acids.

U.S. Pat. No. 3,450,819, Babayan et al., issued June 17, 1969, discloses an oil said to be particularly useful for persons who have difficulty absorbing fats. The oil comprises triglycerides having a major portion of medium chain ($C_{8:0}$ and $C_{10:0}$) fatty acids moieties, and a minor portion of essential fatty acid moieties. The essential fatty acid moieties disclosed are linoleic ($C_{18:2}$), linolenic ($C_{18:3}$), and arachidonic ($C_{20:4}$).

U.S. Pat. No. 4,528,197, Blackburn, issued July 9, 1985, discloses a composition for enhancing protein anabolism in an hypercatabolic mammal. The composition is made of a nutritionally sufficient source of amino acids, carbohydrates and lipids, the lipids comprising a controlled triglyceride source which, on hydrolysis, yields both long chain fatty acids and medium chain fatty acids. One such fatty acid source disclosed is a saturated lipid containing medium chain fatty acids ($C_{8:0}$, $C_{10:0}$, and $C_{12:0}$), and essential fatty acids ($C_{18:2}$, $C_{18:3}$, and $C_{20:4}$) moieties.

European Patent Application No. 201,525, Jandacek et al., published Apr. 1, 1987, relates to a nutritional fat, suitable for use in enteral and parenteral products, consisting essentially of from about 50% to about 100% by weight of tirglycerides having the formula:

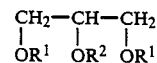

The $R^1$ groups at the 1- and 3-positions consist of medium chain fatty acid residues with chain lengths of 7-11 carbon atoms, and the $R^2$ group in the 2-position consists of a long chain unsaturated fatty acid residue, preferably linoleic ($C_{18:2}$), oleic ($C_{18:1}$), or linolenic ($C_{18:3}$).

Mok et al., "Structured Medium Chain and Long Chain triglyceride emulsions are superior to Physical Mixtures in Sparing Body Protein in the Burned Rat", *Metabolism*, Vol. 33, No. 10, pp. 910-915, October, 1984, describes an emulsion consisting of chemically synthesized triglycerides composed of medium chain and long chain fatty acids in similar proportions said to be useful in sparing body protein in burned rats. The triglycerides were synthesized from caprylic acid ($C_{8:0}$), capric acid ($C_{10:0}$), linoleic acid ($C_{18:2}$), and "other long chain fatty acids."

Maiz et al., "Protein Metabolism During Total Parenteral Nutrition (TPN) in Injured Rats Using Medium Chain Triglycerides," *Metabolism*, Vol. 33, No. 10, pp. 901–909, October, 1984, discloses a chemically structured lipid emulsion, made from triglycerides containing 60% medium chain fatty acid moieties and 40% long chain fatty acid moieties, said to improve protein utilization in injured rats. The medium chain fatty acids utilized were $C_{8:0}$ through $C_{12:0}$, and the long chain fatty acids were derived from sunflower oil (which consists primarily of mixed triglycerides of linoleic, and oleic fatty acid moieties).

U.S. Pat. No. 2,874,056, Drew, issued Feb. 17, 1959, discloses a triglyceride composition useful in margarines. The triglyceride is synthesized from a combination of medium chain fatty acids ($C_{8:0}$ through $C_{12:0}$) and palmitic acid ($C_{16:0}$).

The Captex 810 series of oils (marketed by Capital City Products, Columbus, Ohio) contains random structure triglycerides that are synthesized from mixtures of various ratios of long and medium chain fatty acids. The fatty acid compositions of these oils are as follows:

| Fatty acid composition (weight %) of the Captex 810 series | | | |
|---|---|---|---|
| Captex series | Linoleic ($C_{18:2}$) | Octanoic and Decanoic ($C_{8:0}$ & $C_{10:0}$) | Other |
| 810A | 10 | 80 | 10 |
| 810B | 25 | 60 | 15 |
| 810C | 35 | 46 | 19 |
| 810D | 45 | 32 | 23 |

None of these references disclose or suggest the specially synthesized triglycerides of the present invention, fat compositions containing those triglycerides, or the benefits associated therewith.

SUMMARY OF THE INVENTION

The present invention relates to reduced calorie fats comprising triglycerides synthesized (tailored) with a combination of saturated medium chain, saturated long chain and unsaturated long chain fatty acids. In particular, the reduced calorie fat comprises:
 (a) at least about 30% by weight triglycerides selected from the group consisting of SUM and SMU triglycerides, and mixtures thereof;
 (b) not more than about 18% by weight MMM triglycerides; and
 (c) not more than about 30% by weight triglycerides selected from the group consisting of MMS, MSM, SSM and SMS triglycerides, and mixtures thereof;
wherein M is a saturated fatty acid moiety selected from the group consisting of $C_{6:0}$, $C_{8:0}$, and $C_{10:0}$ fatty acids, and mixtures thereof; wherein S is a saturated fatty acid moiety selected from the group consisting of $C_{18:0}$, $C_{20:0}$, $C_{22:0}$, $C_{24:0}$, $C_{26:0}$, $C_{28:0}$, and $C_{30:0}$ fatty acids, and mixtures thereof; and wherein U is an unsaturated fatty acid moiety selected from the group consisting of $C_{18:1}$, $C_{18:2}$, $C_{18:3}$, $C_{20:3}$, $C_{20:4}$, $C_{20:5}$, $C_{22:4}$, $C_{22:5}$, and $C_{22:6}$ fatty acids, and mixtures thereof.

The reduced calorie fat of the present invention has excellent organoleptic properties (i.e., texture, mouthmelt and flavor display). The fat can be used in a wide variety of food products (e.g., snacks, desserts, prepared mixes, frozen entrees, chocolate products, frozen desserts, salad dressings, frying and baking shortenings, margarines, spreads, prewhipped toppings frostings, cookies, cakes, and bread), as well as cooking shortenings and oils.

DETAILED DESCRIPTION OF THE INVENTION

Medium chain triglycerides (MCT's) are unique fats with potential health and dietary benefits (e.g., improved serum lipid profile and at least 10% reduction in calories). However, MCT's also have smoke, flash and fire point temperatures and autoignition characteristics which are less acceptable than those of commercial frying shortenings or oils (e.g., Crisco). This makes MCT's unacceptable for use in cooking oils and shortenings, in spite of their nutritional benefits.

The smoke point is defined as the temperature at which volatile products are sufficiently evolved to become visible; the flash point is the temperature at which these volatiles are capable of being ignited but not able to support combustion; and the fire point is the temperature at which the volatiles can support continued combustion. Autoignition is defined as the point at which a substance will ignite without the aid of a spark or flame. The time to autoignition for MCT oil has been found to be considerably shorter than for common vegetable oils. This is a serious problem as edible oils are subjected to high heat during cooking, especially during frying when temperatures as high as 500° F. can be reached.

In one aspect of this invention it has now been discovered that unsaturated fatty acids play a critical role in determining the autoignition characteristics of triglycerides. Without being bonded by theory, it is believed that as the extent of unsaturation increases in a triglyceride, the autoignition time increases. The autoignition property of MCT oil, therefore, can be significantly improved by incorporating unsaturated fatty acids into the MCT molecule. In fact, the present development improves the autoignition characteristics of medium chain triglycerides to nearly that of commercial frying shortenings and oils by replacing a medium chain fatty acid moiety in the triglyceride molecule with a long chain unsaturated fatty acid moiety (e.g., $C_{18:1}$, $C_{18:2}$, and $C_{18:3}$). While the use of long chain unsaturated fatty acids is critical to the solution of the autoignition problem, they provide no caloric reduction. Hence, in formulating the triglycerides used in the present invention, the level of long chain unsaturated fatty acids in the molecule must be carefully balanced to give acceptable autoignition characteristics while still providing caloric reduction.

In another aspect of this invention, it has been found that the absorbability of a long chain saturated fatty acid moiety depends on its position in the triglyceride molecule, with its absorption being reduced when the acid moiety is in a primary position (1st or 3rd carbon atom) of the triglyceride. See e.g., Mattson, Nolen and Webb, "The Absorbability by Rats of Various Triglycerides of Stearic and Oleic Acid and the Effect of Dietary Calcium and Magnesium", *The Journal of Nutrition*, Vol. 109, No. 10, pp. 1682–1687 (October, 1979). However, the saturated long chain fatty acid moiety is well absorbed when the moiety is in a secondary position (2nd carbon atom) of the triglyceride. Therefore, caloric reduction is achieved by incorporating a long chain saturated fatty acid on one of the primary carbon atoms of the tricglyceride due to the non-absorption of the fatty acid moiety. The caloric reduction provided by the present invention results from both the incorporation of medium chain saturated fatty acids, and from properly positioned (i.e., in the 1st or 3rd position) long chain saturated fatty acids in the triglyceride molecule.

Based on the above criteria, the reduced calorie fat of the present invention is tailored to include specific levels of medium chain saturated fatty acids, properly positioned long chain saturated fatty acids, and long chain unsaturated fatty acids. The reduced calorie fat comprises at least about 30%, preferably at least about 50%, triglycerides selected from the group consisting of SUM and SMU triglycerides, and mixtures thereof.

To ensure acceptable autoignition characteristics, the reduced calorie fat should not contain
(a) more than about 18%, preferably not more than about 5%, MMM triglycerides; and
(b) not more than about 30%, preferably not more than about 12%, triglycerides selected from the group consisting of MMS, MSM, SSM, and SMS triglycerides, and mixtures thereof.

In order to maximize caloric reduction, the level of long chain unsaturated fatty acid moieties in the triglyceride, as well as long chain saturated fatty acids not in a primary position, must be carefully regulated. Therefore, preferred reduced calorie fat compositions of the present invention comprise some or all of the following (in addition to the above limitations)
(c) not more than about 18%, most preferably not more than about 5%, UUU triglycerides;
(d) not more than about 10%, most preferably not more than about 2%, SSS triglycerides;
(e) not more than about 30%, most preferably not more than about 12%, triglycerides selected from the group consisting of UUM, UMU, MMU, and MUM triglycerides, and mixtures thereof;
(f) not more than about 30%, most preferably not more than about 12%, tirglycerides selected from the group consisting of SSU, SUS, UUS, and USU triglycerides, and mixtures thereof; and
(g) not more than about 30%, most preferably not more than about 12%, MSU triglycerides; wherein M is a saturated fatty acid moiety selected from the group consisting of $C_{6:0}$ (caproic), $C_{8:0}$ (caprylic), and $C_{10:0}$(capric) fatty acids, and mixtures thereof; wherein S is a saturated fatty acid moiety selected from the group consisting of $C_{18:0}$ (stearic), $C_{20:0}$ (arachidic), $C_{22:0}$ (behenic), $C_{24:0}$(lignoceric), $C_{26:0}$ (cerotic), $C_{28:0}$ (montonic), and $C_{30:0}$(melissic) fatty acids, and mixtures thereof; and wherein U is an unsaturated fatty acid moiety selected from the group consisting of $C_{18:1}$ (oleic), $C_{18:2}$ (linoleic), $C_{18:3}$ (linolenic), $C_{20:3}$(dihomo -linolenic), $C_{20:4}$ (arachidonic), $C_{20:5}$ (eicosapentaenoic), $C_{22:4}$ (docosatetraenoic), $C_{22:5}$ (docosapentaenoic) $C_{22:6}$(docosahexaenoic) fatty acids, and mixtures thereof.

In the above listing of fatty acid moieties, the common name of the fatty acid is given following its $C_{x:y}$ designation (wherein x is the number of carbon atoms, and y is the number of double bonds).

Preferably, M is a saturated fatty acid moiety selected from the group consisting of $C_{8:0}$ and $C_{10:0}$ fatty acids, and mixtures thereof; S is $C_{18:0}$ saturated fatty acid moiety; and U is an unsaturated fatty acid moiety selected from the group consisting of $C_{18:1}$, $C_{18:2}$, and $C_{18:3}$ fatty acids, and mixtures thereof.

As used herein, the notation "XYZ triglyceride" refers to a triglyceride having the formula

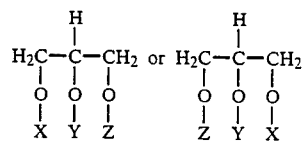

since the 1st and 3rd carbon of the triglyceride are equivalent for purposes of the present invention. Therefore, an XYZ triglyceride has X and Z in the equivalent 1 and 3 carbon positions and Y at the 2 position.

For an all-purpose cooking oil or for frying uses, the MMM content of the triglyceride compositions should be less than about 5%, and most preferably less than about 1%. The amount of SSS triglyceride should preferably be less than about 0.5% by weight.

The SUM and SMU triglycerides of the present invention have the following preferred fatty acid compositions (percentages are by weight of the total composition):
(a) not more than about 5% $C_{6:0}$ saturated fatty acid;
(b) from about 10% to about 60% saturated fatty acids selected from the group consisting of $C_{8:0}$ and $C_{10:0}$fatty acids, and mixtures thereof;
(c) from about 10% to about 60% $C_{18:0}$ saturated fatty acid;
(d) not more than about 8% saturated fatty acids selected from the group consisting of $C_{20:0}$, $C_{22:0}$, $C_{24:0}$, $C_{26:0}$, $C_{28:0}$, and $C_{30:0}$ fatty acids, and mixtures thereof;
(e) from about 20% to about 70% unsaturated fatty acids selected from the group consisting of $C_{18:1}$, $C_{18:2}$, and $C_{18:3}$ fatty acids, and mixtures thereof; and
(f) not more than bout 10% unsaturated fatty acids selected from the group consisting of $C_{20:3}$, $C_{20:4}$, $C_{20:5}$, $C_{22:4}$, $C_{22:5}$, and $C_{22:6}$ fatty acids, and mixtures thereof.

Preferred triglycerides have a formula selected from the group consisting of

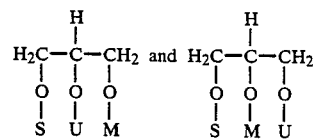

wherein M is a saturated fatty acid moiety selected from the group consisting of $C_{6:0}$, $C_{8:0}$, and $C_{10:0}$ fatty acids (preferably $C_{8:0}$ and $C_{10:0}$), and mixtures thereof; wherein S is a saturated fatty acid moiety selected from the group consisting of $C_{18:0}$, $C_{20:0}$, $C_{22:0}$, $C_{24:0}$, $C_{26:0}$, $C_{28:0}$, and $C_{30:0}$ fatty acids (preferably $C_{18:0}$), and mixture thereof; and wherein U is an unsaturated fatty acid moiety selected from the group consisting of $C_{18:1}$, $C_{18:2}$, $C_{18:3}$, $C_{20:3}$, $C_{20:4}$, $C_{20:5}$, $C_{22:4}$, $C_{22:5}$, and $C_{22:6}$ fatty acids (preferably $C_{18:1}$, $C_{18:2}$, and $C_{18:3}$), and mixtures thereof.

Especially preferred are triglycerides having the formula:

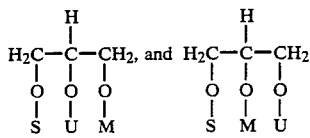

wherein S is $C_{18:0}$ fatty acid moiety, U is $C_{18:2}$ fatty acid moiety, and M is $C_{18:0}$ fatty acid moiety.

The key to the reduced calorie fats of the present invention is the unique triglycerides synthesized with a particular combination of medium chain saturated fatty acids, properly positioned long chain saturated fatty acids, and long chain unsaturated fatty acids. A caloric reduction benefit is obtained because of the medium chain and properly positioned long chain saturated fatty acid moieties, whereas the long chain unsaturated fatty acid moieties provide improved autoignition characteristics compared to MCT's. In addition, the reduced calorie fat of the present invention has excellent organoleptic properties (i.e., texture, mouthmelt and flavor display). the fat can be used in a wide variety of food products (e.g., snacks, desserts, prepared mixes, frozen entrees, chocolate products, frozen desserts, salad dressings, frying and baking shortenings, margarines, spreads, prewhipped toppings, frostings, cookies, cakes, and bread), as well as cooking shortenings and oils.

The fat can be used as a partial or complete replacement for the fat component in food products. However, to achieve the benefits of the present invention, from about 10% to about 100% (preferably at least about 25%) of the fat component in the food product comprises the reduced calorie fat compositions of the present invention.

Similarly, reduced calorie cooking oils are comprised of from about 10% to about 100% (preferably at least about 25%) of the reduced calorie fat compositions of the present invention. The remainder of the low-calorie oil (and fat) compositions will comprise other standard fats or fat-like materials, for example, triglycerides of straight chain or branched chain, saturated or unsaturated, monocarboxylic acids having from 10 to 28 carbon atoms. Suitable sources of such oils include: (1) vegetable fats and oils, such as soybean, corn, sunflower, rapeseed, low erucic acid rapeseed, canola, cottonseed, olive, safflower, sesame seed, nasturtium seed, tiger seed, ricebran, wallflower, and mustard seed; (2) meat fats such as tallow or lard; (3) marine oils, such as menhaden, pilcherd, sardine, whale or herring; (4) nut fats and oils, such as coconut, palm, palm kernel, babassu kernel, or peanut; (5) milkfat, butterfat; (6) cocoa butter and cocoa butter substitutes such as shea, or illipe butter; and (7) synthetic fats.

Other fats or fat-like materials useful in the present fat compositions include noncaloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other useful fats are medium chain triglycerides, highly esterified polyglycerol esters, acetin fats, plant sterol esters, polyoxyethylene esters, jojoba esters, mono-diglycerides of fatty acids, and mono-diglycerides of short-chain dibasic acids.

Fat-like materials useful in the present fat invention include sugar fatty acid polyesters or sugar alcohol fatty acid polyesters having at least 4 fatty acid ester groups with each fatty acid having from 8 to 22 carbon atoms. Such polyesters and their use in conventional food products have been disclosed in U.S. Pat. No. 3,600,186, Mattson, et al., issued Aug. 17, 1971, the disclosure of which is incorporated herein by reference.

The fats and oils can contain minor amounts of conventional additives, such as optional flavorings, emulsifiers, anti-spattering agents, anti-sticking agents, anti-oxidants, or the like.

The reduced calorie fats of the present invention can be prepared, for example, by first synthesizing a monoglyceride containing a long chain saturated fatty acid moiety in a primary position (e.g., 1- or 3-monostearin). This is accomplished by reacting the terminal hydroxy group of a suitably protected glycerol molecule (e.g., solketal) with a long chain saturated fatty acid chloride, and then removing the acetonide protecting group. The resulting 1 and 3-specific monoglycerides are then acylated with an equal molar amount of a medium chain fatty acid chloride (e.g., octanoyl chloride) to yield a diglyceride. The resulting diglyceride is acylated with an excess of long chain unsaturated fatty acid chlorides (e.g., linoleoyl chloride) to yield a triglyceride containing a saturated long chain fatty acid residue in a primary position, and a medium chain saturated fatty acid residue and a long chain unsaturated fatty acid residue randomly distributed in the remaining two positions. A detailed example of the synthesis of preferred triglycerides used in the present invention is disclosed hereinafter.

The reduced-calorie fat compositions of this invention can be modified to satisfy specific product performance requirements by additional fractionation. Solvent and non-solvent crystal fractionation or fractional distillation methods (e.g. molecular distillation) can be applied to optimize performance. Standard fractionation methods are discussed in Applewhite, *Bailey's Industrial oil and Fat Products*, Vol. 3, 4th ed. (1985), pp. 1–39, John Wiley & Sons, New York, incorporated by reference herein.

The following examples are intended only to further illustrate the invention and are not intended to limit its scope.

EXAMPLE 1

Synthesis of triglycerides that contain a stearic acid moiety ($C_{18:0}$) at either the 1 or 3 position, a linoleic acid moiety ($C_{18:2}$) and an octanoic acid moiety ($C_{8:0}$) (the latter two fatty acid moieties being randomly distributed in the remaining two positions) is accomplished using the following process:

Step 1 - Synthesis of 1-Monostearin

*Stearoyl chloride:* 1420g (5 moles) of stearic acid and 6 liters of ethylene dichloride are placed in a 12-liter flask and warmed to 45° C. 1270 g (10 moles) of oxalyl chloride is added dropwise over a 2.5 hour time period. After 1 hour of refluxing, the flask is blanketed with argon and cooled overnight. The solvent is removed and the stearoyl chloride is used without further purification.

*1-Monostearin:* In a 5-liter flask, under argon, are placed 726g (5.5 moles) isopropylidene-glycerol, 505g (5 moles) triethylamine, and 6.1g (.05 moles) 4-dimethylaminopyridine. The previously prepared stearoyl chloride is dissolved in 650ml toluene and added dropwise over a 3 hour time period. The mixture is stirred for 2 hours and then kept at room temperature overnight. The solids are filtered and washed 3X with toluene. The solids are dissolved in CHCl$_3$ and washed 6X with a total of 8 liters of water. After the organic layer is dried, the solvent is evaporated. The remaining oil is crystallized from acetone (0° C.). The solids are filtered and vacuum dried.

The solids from this reaction are dissolved in 12 liters of acetonitrile and treated with 500 ml of 1N HCl at 45° for 1 hour. The reaction is then neutralized with 500 ml of 1N NaOH. 24 liters of CHCl$_3$ and 4 liters of water are added and the water layer is separated after standing overnight at room temperature. The CHCl$_3$ is the evaporated and the residue dissolved in 20 liters of hot (refluxing) hexane. Any remaining solids are filtered out. The solution is allowed to cool overnight at room temperature. The monostearin crystals are filtered and vacuum dried (1437g). TLC (This Layer Chromotography) analysis show 98.0% 1-monostearin, 1.4% 2-monostearin and trace amounts of other glycerides and fatty acids.

Step 2 - Synthesis of Diglyceride (octanoyl-1-stearoyl-glycerol)

240g (0.67 mole) of 1-monostearin (from Step 1) is dissolved in 1 liter of chloroform. 56 ml of pyridine (0.67 moles) is added to the mixture. The chloroform is washed three times with water and dried over MgSO$_4$. The pyridine is dried over molecular sieves(3A) before use. To the clear yellow solution is added dropwise 114 ml (0.67 moles) of octanoyl chloride. The reaction is gently warmed with a heating mantle and stirred for 4 hours. TLCs (silica gel; petroleum ether/ethyl ether/acetic acid, 90:10:1) are used to confirm the formation of diglycerides, Rf=0.06[10×20 cm pre-scored glass plates, 250 micron silica gel; visualization by I$_2$ staining]. Upon completion of the reaction, the solvent is removed via rotary evaporation under reduced pressure. The remaining solid/oil is divided into three portions and recrystallized from three volumes of hexane. The solid diglycerides are collected by suction filtration. The reaction yield is 89%.

Step 3 - Preparation of Unsaturated Fatty Acids From Safflower Oil 500g of safflower oil is placed into a 2-liter round bottom flask. 111g of KOH is dissolved in 500ml of methanol and is added to the oil. After refluxing for 3 hours, the mixture is cooled and the methanol is carefully removed (severe bumping may occur) via rotary evaporation under reduced pressure. To the resulting soap is added 200ml of concentrated HCl (12N). After the soap dissolves, an additional 50ml of HCl is added. The solution is passed through glass wool to remove the salts. The liquid portion is placed in a separatory funnel with 600ml of petroleum ether and extracted with 600ml (3X) of water. The organic layer is dried over MgSO$_4$, filtered, and the solvent is removed via rotary evaporation under reduced pressure. The remaining oil is stored at 4° C. (refrigeration) overnight. The saturated acids are removed by adding cold acetone and filtering out the solids. The acetone is removed and the fatty acids are stored at 4° C. under nitrogen.

Step 4 - Preparation of Unsaturated Fatty Acid Acyl Chlorides

In a 2-liter round bottom flask are placed 250g of fatty acids (from Step 3) and 500ml of hexane. 120ml of oxalyl chloride is added dropwise and the reaction stirred overnight under nitrogen. The hexane is then removed via rotary evaporation under reduced pressure. After all the hexane is removed, the flask is heated (90° C. water bath) under vacuum for an additional 30 minutes. The flask is cooled and the fatty acyl chlorides are stored under nitrogen in the freezer. The formation of acyl chlorides is confirmed by GC and IR (neat); 1800-300cm$^-$  1800cm$^-$, 1450cm$^-$-1400cm$^-$, 1370cm$^-$, 1050cm$^-$, 1050-900cm$^-$, 770-630cm$^-$. The acyl chlorides are used without purification.

Step 5 - Synthesis of Triglycerides 300g (0.62 moles) of the diglyceride (from Step 2) is dissolved in 2 liters of washed chloroform. If an aqueous layer forms, it is separated and the organic layer is further dried with MgSO$_4$ or silica gel. The clear solution is then placed into a 5-liter round bottom flask and 50ml (0.62 moles) of pyridine is added. 271g (0.91 moles) of the unsaturated fatty acid acyl chlorides (from Step 4) are added dropwise and the reaction is stirred at room temperature. TLCs (silica gel; petroleum ether/ethyl ether/acetic acid, 90:10:1) are used to confirm the formation of triglycerides, Rf=0.40 [10×20 cm pre-scored glass plates, 250 micron silica gel; visualization by I$_2$ staining]. After 4 days, the reaction mix is divided into three 2-liter separatory funnels and washed with 500ml (2X) water, 500ml (3X) 0.1N HCl, and 500ml (3X) water. the organic layers are combined, dried with MgSO$_4$, and filtered. The solvent is removed via rotary evaporation under reduced pressure. The remaining oil is divided into two portions and recrystallized in 3-4X volumes of acetone at −20° C. (freezer). After 1 day, the liquid portion is carefully decanted and fresh acetone is added. This procedure is repeated two more times. The solids are collected by suction filtration and recrystallized a final time. To remove residual contaminants, the resulting oil is passed through a large plug of silica gel and deodorized. Fatty acid composition and triglyceride composition of the synthesized fat are determined by GC and HPLC analysis.

Fatty Acid Analysis (Gas Chromatography)

0.1g of fatty sample is weighed into a 10 dram vial. 4ml of methanolic sodium hydroxide (0.50M) is added and the vial is heated for 15 minutes at 70° C. After cooling to room temperature, 3.0 ml of BF$_3$ is added and again the vial is heated for 15 minutes at 70° C. The vial is then cooled to room temperature and 0.75ml of saturated NaCl solution is added. The mixture is shaken and allowed to settle. The sample is then extracted with 4ml of hexane. The hexane layer is pipetted off and dried with sodium sulfate. A portion is used for GC analysis. GC conditions: OV-1 12.5m×0.2m column (J&W Scientific), 80° C. to 220° C. at 20°/min.)

The major fatty acids of the synthesized fat, as determined by GC, are shown in the following table:

| Fatty acid | % (by weight) |
| --- | --- |
| octanoic acid (C$_{8:0}$) | 16 |
| stearic acid (C$_{18:0}$) | 37 |
| linoleic acid (C$_{18:2}$) | 37 |
| oleic acid (C$_{18:1}$) | 6.8 |
| miscellaneous | 3.2 |
|  | 100.0% |

Triglyceride Analysis (HPLC)

Reverse-phase HPLC (high pressure liquid chromotography) is used to separate and identify the individual triglyceride species. Two reverse phase, ODS-5 (4.6 mm ID, 25 cm long), columns (Whatman) are used in series. The mobile phase is a 40 minute gradient of $CH_2Cl_2$ and $CH_3CN$ (25%–50% $CH_2Cl_2$). The detector is an evaporative light scattering mass detector. The characterization of the separated triglycerides is confirmed by mass spectrometry.

The triglyceride composition of the synthesized fat, determined by HPLC analysis, is shown in the following table

| Triglyceride | Percent by weight |
| --- | --- |
| $C_{18:0}$ $C_{18:3}$ $C_{8:0}$ SUM and $C_{18:0}$ $C_{8:0}$ $C_{18:3}$ SMU | 2 |
| $C_{18:0}$ $C_{18:2}$ $C_{8:0}$ SUM and $C_{18:0}$ $C_{8:0}$ $C_{18:2}$ SMU | 75 |
| $C_{18:0}$ $C_{18:1}$ $C_{8:0}$ and $C_{18:0}$ $C_{8:0}$ $C_{18:1}$ SMU | 14 |
| $C_{18:0}$ $C_{8:0}$ $C_{16:0}$ (SMS) | 3 |
| $C_{18:0}$ $C_{18:1}$ $C_{18:2}$ (SUU) | 6 |

The following examples illustrate reduced calorie fat-containing food compositions of the present invention. These compositions are made using the formulations set forth below and combining the listed components using conventional techniques.

EXAMPLE II - Cooking Oil

A reduced calorie cooking oil, having acceptable autoignition characteristics and good organoleptic properties, is composed of the triglyceride composition, prepared according to Example I, which consists primarily of

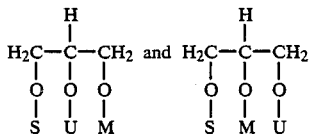

triglycerides, wherein S is $C_{18:0}$ fatty acid moiety, U is $C_{18:2}$ fatty acid moiety, and M is $C_{8:0}$ fatty acid moiety.

Substantially similar results are obtained when U is replaced, in whole or in part, with an unsaturated fatty acid moiety selected from the group consisting of $C_{18:1}$, and $C_{18:3}$ fatty acids, and mixtures thereof; and when M is replaced, in whole or in part, with a $C_{10:0}$ fatty acid moiety.

EXAMPLE III - Salad Oil

| | Percent by weight |
| --- | --- |
| 50/50 (by weight) blend of cottonseed oil and soybean oil | 50 |
| Olive oil | 25 |
| Triglyceride composition prepared according to Example I | 25 |

EXAMPLE IV - Plastic Shortening

| | Percent by weight |
| --- | --- |
| Lightly hydrogenated soybean oil (I.V. 107) | 50 |
| Triglyceride composition prepared according to Example I | 40 |
| Tristearin (hardstock, I.V. 8) | 10 |

EXAMPLE V - Prepared Cake Mix

| | Percent by weight |
| --- | --- |
| Sugar | 35–50 |
| Flour | 25–50 |
| Plastic Shortening (per Example IV) | 5–30 |
| Leavening | 1–4 |
| Cocoa | 0–7 |
| Egg | 0–5 |
| Milk solids | 0–5 |

EXAMPLE VI - Mayonnaise

| | Percent by weight |
| --- | --- |
| Triglyceride composition prepared according to Example I | 75 |
| Vinegar | 10 |
| Egg yolk | 9 |
| Sugar | 3 |
| Salt | 1 |
| Mustard | 2 |

EXAMPLE VII - Salad Dressing

| | Percent by weight |
| --- | --- |
| Triglyceride composition prepared according to Example I | 50 |
| Corn starch | 5 |
| Vinegar | 10 |
| Water | 35 |

EXAMPLE VIII - Margarine

| | Percent by weight |
| --- | --- |
| Triglyceride composition prepared according to Example I | 80 |
| Milk solids | 2 |
| Salt | 2 |
| Monostearate | 1 |
| Water | 15 |

As exemplified above, a wide variety of reduced calorie fat-containing food compositions can be prepared from the tailored triglycerides disclosed herein. Preferred food compositions are those selected from the group consisting of cooking oil, salad oil, plastic shortening, prepared culinary mixes, (e.g., for cakes, icings, and the like) mayonnaise, and margarine.

What is claimed is:

1. A reduced calorie fat having improved autoignition characteristics comprising:
   (a) at least about 30% by weight triglycerides selected from the group consisting of SUM and SMU triglycerides, and mixtures thereof;
   (b) not more than about 18% by weight MMM triglycerides; and (c) not more than about 30% by weight triglycerides selected from the group consisting of MMS, MSM, SSM, and SMS triglycerides, and mixtures thereof; wherein M is a saturated fatty acid moiety selected from the group consisting of $C_{6:0}$, $C_{8:0}$, and $C_{10:0}$ fatty acids, and mixtures thereof; wherein S is a saturated fatty acid moiety selected from the group consisting of $C_{18:0}$, $C_{20:0}$, $C_{22:0}$, $C_{24:0}$, $C_{26:0}$, $C_{28:0}$, and $C_{30:0}$ fatty acids, and mixtures thereof; and wherein U is an unsaturated fatty acid moiety selected from the group consisting of $C_{18:1}$, $C_{18:2}$, $C_{18:3}$, $C_{20:3}$, $C_{20:4}$, $C_{20:5}$, $C_{22:4}$, $C_{22:5}$, and $C_{22:6}$ fatty acids, and mixtures thereof.

2. A reduced calorie fat according to claim 1 comprising at least about 50% by weight triglycerides selected from the group consisting of SUM and SMU triglycerides, and mixtures thereof.

3. A reduced calorie fat according to claim 2 comprising not more than about 5% by weight MMM triglycerides.

4. A reduced calorie fat according to claim 2 comprising not more than about 12% by weight triglycerides selected from the group consisting of MMS, MSM, SSM, and SMS triglycerides, and mixtures thereof.

5. A reduced calorie fat according to claim 1 comprising not more than about 18% by weight UUU triglycerides.

6. A reduced calorie fat according to claim 1 comprising not more than about 10% by weight SSS triglycerides.

7. A reduced calorie fat according to claim 1 comprising not more than about 30% by weight triglycerides selected from the group consisting of UUM, UMU, MMU, and MUM triglycerides, and mixtures thereof.

8. A reduced calorie fat according to claim 1 comprising not more than about 30% by weight triglycerides selected from the group consisting of SSU, SUS, UUS, and USU triglycerides, and mixtures thereof.

9. A reduced calorie fat accordng to claim 1 comprising not more than about 30% by weight MSU triglycerides.

10. A reduced calorie fat according to claim 1 wherein the SUM and SMU triglycerides have the following fatty acid composition:
(a) not more than about 5% $C_{6:0}$ saturated fatty acid;
(b) from about 10% to about 60% saturated fatty acids selected from the group consisting of $C_{8:0}$ and $C_{10:0}$ fatty acids, and mixtures thereof;
(c) from about 10% to about 60% $C_{18:0}$ saturated fatty acid;
(d) not more than about 8% saturated fatty acids selected from the group consisting of $C_{20:0}$, $C_{22:0}$, $C_{24:0}$, $C_{26:0}$, $C_{28:0}$, and $C_{30:0}$ fatty acids, and mixtures thereof;
(e) from about 20% to about 70% unsaturated fatty acids selected from the group consisting of $C_{18:1}$, $C_{18:2}$, and $C_{18:3}$ fatty acids, and mixtures thereof; and
(f) not more than about 10% unsaturated fatty acids selected from the group consisting of $C_{20:3}$, $C_{20:4}$, $C_{20:5}$, $C_{22:4}$, $C_{22:5}$, and $C_{22:6}$ fatty acids, and mixtures thereof.

11. A reduced calorie fat according to claim 2 wherein M is selected from the group consisting of $C_{8:0}$ and $C_{10:0}$ fatty acids, and mixtures thereof, wherein S is a $C_{18:0}$ saturated fatty acid moiety, and wherein U is selected from the group consisting of $C_{18:1}$, $C_{18:2}$ and $C_{18:3}$ fatty acids, and mixtures thereof.

12. A reduced calorie fat according to claim 11 comprising not more than about 1% by weight MMM triglycerides and not more than about 0.5% by weight SSS triglycerides.

13. A reduced calorie fat according to claim 12 wherein M is $C_{8:0}$ fatty acid moiety and U is $C_{18:2}$ fatty acid moiety.

14. A triglyceride having the formula selected from the group consisting of

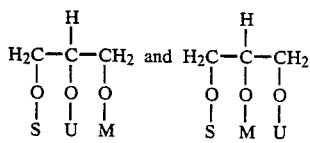

wherein M is a saturated fatty acid moiety selected from the group consisting of $C_{6:0}$, $C_{8:0}$, and $C_{10:0}$ fatty acids, and mixtures thereof; wherein S is a saturated fatty acid moiety selected from the group consisting of $C_{18:0}$, $C_{20:0}$, $C_{22:0}$, $C_{24:0}$, $C_{26:0}$, $C_{28:0}$, and $C_{30:0}$ fatty acids, and mixtures thereof; and wherein U is an unsaturated fatty acid moiety selected from the group consisting of $C_{18:1}$, $C_{18:2}$, $C_{18:3}$, $C_{20:3}$, $C_{20:4}$, $C_{20:5}$, $C_{22:4}$, $C_{22:5}$, and $C_{22:6}$ fatty acids, and mixtures thereof.

15. A triglyceride according to claim 14 wherein M is selected from the group consisting of $C_{8:0}$ and $C_{10:0}$ fatty acids, and mixtures thereof, wherein S is $C_{18:0}$ saturated fatty acid and wherein U is selected from the group consisting of $C_{18:1}$, $C_{18:2}$, and $C_{18:3}$ fatty acids, and mixtures thereof.

16. A triglyceride according to claim 15 wherein S is $C_{18:0}$ fatty acid moiety, U is $C_{18:2}$ fatty acid moiety, and M is $C_{8:0}$ fatty acid moiety.

17. A reduced calorie food composition wherein from about 10% to about 100% of the fat component of the food composition comprises the fat of claim 1.

18. A reduced calorie cooking oil comprising from about 10% to about 100% of the fat of claim 1 and from about 0% to about 90% fats and oils.

* * * * *